United States Patent Office 3,287,697
Patented Nov. 22, 1966

3,287,697
CODE INTEGRITY CHECKS FOR CODED
REMOTE CONTROL SYSTEMS
Arthur P. Jackel, Penn Hills Township, Allegheny County,
Pa., assignor to Westinghouse Air Brake Company,
Wilmerding, Pa., a corporation of Pennsylvania
Filed July 5, 1962, Ser. No. 207,734
6 Claims. (Cl. 340—146.1)

My invention pertains to code integrity checks for coded remote control systems. More particularly, this invention pertains to a check arrangement which assures that internal system faults and/or externally induced interruptions have not deformed a code sequence by which intelligence is transmitted in coded remote control systems.

Remote control systems of the coded type are well known in the signaling and communication art. One particular form in common use is the time code system, one example of which is disclosed in Letters Patent of the United States 2,442,603, issued to me on June 1, 1948, for a Remote Control System. Other forms of coded systems use binary and polar codes. In the transmission of the code over the many types of communication channels in present day use, the code pattern is subject to various errors which may be introduced by internal or external causes, such as, respectively, apparatus faults and induced pulses from natural causes. These errors introduced into the code take the form of interruptions or changes in the transmitted code pattern as received at the other location. Various arrangements have been proposed and used to check the transmission of codes in these systems. The most simple of such checks is a count of the total number of pulses received at the receiving location. However, it is obvious that such a counting check is not a complete assurance since, although the pattern of the code itself may be shifted, the number of steps in the code may not be changed. Another form of checking is a step by step answer-back arrangement, known in the art, in which each received code step is immediately transmitted back to the transmitting location where its form, polarity, length, or other dominant characteristic is checked, by direct comparison with the transmitted form, for accuracy of transmission. A similar type checking arrangement requires the transmission back from the receiving location of the complete code, as received, prior to the execution of the commands or other functions received at that location. In this check-back arrangement, the initially transmitted code is compared with the received check-back code and, if agreement exists, an execution command is transmitted to the original receiving location. The step by step answer-back and the check-back code arrangement are not completely satisfactory for checking purposes when transmission or pulse-time delays are encountered in the communication system used. In order to compensate for the transmission delay time of the communication channel in such cases, additional circuits and apparatus are required, thus increasing the cost of the arrangement. Considerable advantage is obtained if the check of the code pulses may be made an integral part of the code itself. With such an arrangement, no answer-back channel is needed between the two locations. The pulse delay time or transmission delay time is the same for the check pulse as for the pulses being checked since all are being transmitted at relatively the same time and in the same direction over the same communication channel. In addition, the integrity check is accomplished on the spot at the receiving location, eliminating the necessity for answer-back or additional transmission of the code.

Accordingly, an object of my invention is an improved code integrity check arrangement for coded remote control systems.

Another object of my invention is an integrity checking arrangement for coded remote control systems in which the check is an integral part of each transmitted code.

It is also an object of my invention to provide an arrangement in a coded remote control system to check the integrity of the code pattern received at a receiving location in the system.

Still another object of my invention is a code integrity checking arrangement for remote control systems which will enable the detection of faults introduced into a code as it is transmitted to a receiving location of the system.

A further object of my invention is a checking arrangement at a station in a remote control system by which the characteristics of a transmitted code may be compared with the similar characteristics of the code as received at that location.

It is also an object of my invention to provide an integrity check arrangement in a remote control system by which a particular characteristic of a transmitted code pattern is included as part of the transmitted code and compared with a similar characteristic of the code as it is received at the selected destination of that code.

Another object of my invention is a code checking arrangement for remote control systems in which an indication of a selected characteristic of a transmitted function code pattern, modified by a selected characteristic of the station selection code pattern, is transmitted as an integral part of the code and compared with similar characteristics of the function and station code patterns as received at the receiving station for that code, final registry of the functions being completed only when the compared characteristics are determined to be equivalent.

Another object of my invention is a code integrity checking arrangement by which a selected composite characteristic of the station and function code pattern of each code transmitted in the system is included as an integral part of that code for comparison at the receiving station with the similar composite station and function characteristic of the received code, any lack of agreement between the similar characteristics resulting in a rejection of the received code prior to function registry.

Other objects, features, and advantages of my invention will become apparent from the following specification when taken in connection with the accompanying drawings.

I shall now describe both generally and in specific detail the apparatus and operation of the system of my invention and then point out the novelty thereof in the appended claims. In the following description, reference will be made to the accompanying drawings in which:

Figure 1:
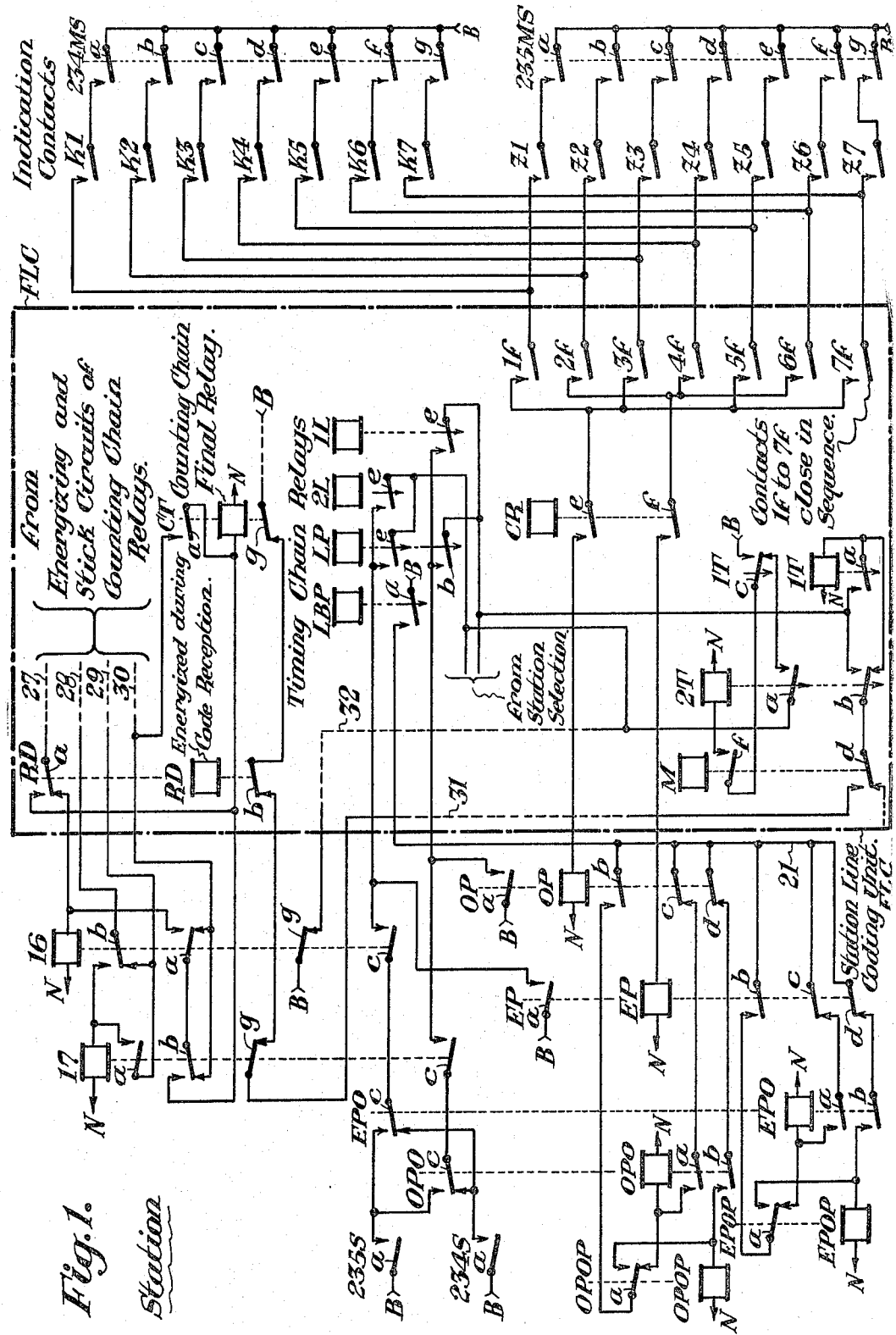
FIG. 1 is a diagrammatic illustration of the apparatus and circuits at a transmitting station in a time code remote control system, the arrangement embodying a first form of the system of my invention.
Figure 2:
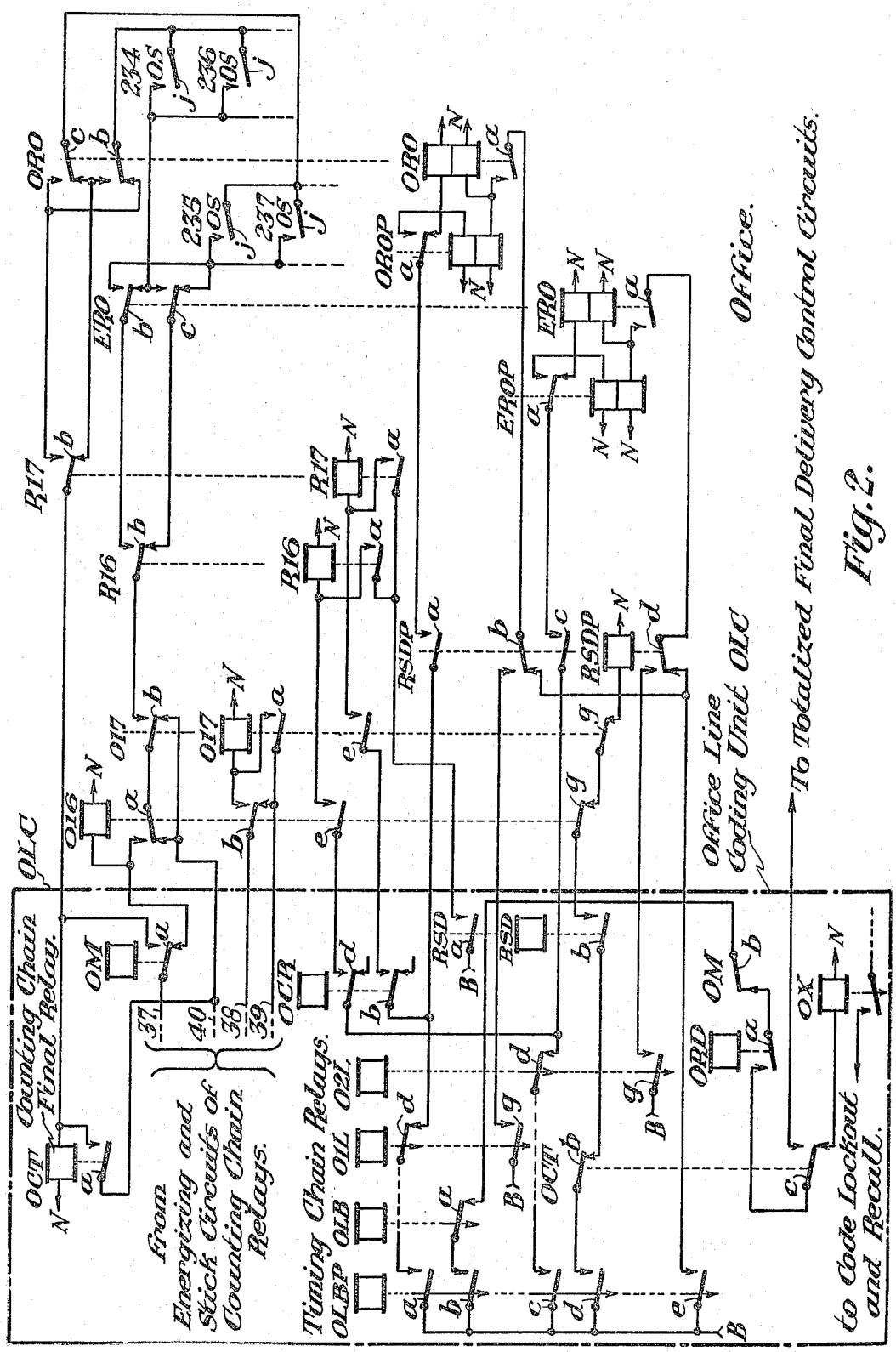
FIG. 2 is a diagrammatic illustration of the apparatus and circuits at a receiving location in a remote control system which cooperate with the arrangement shown in FIG. 1 to provide a complete system, these circuits at the receiving location also embodying the first form of my invention.
Figure 3A:
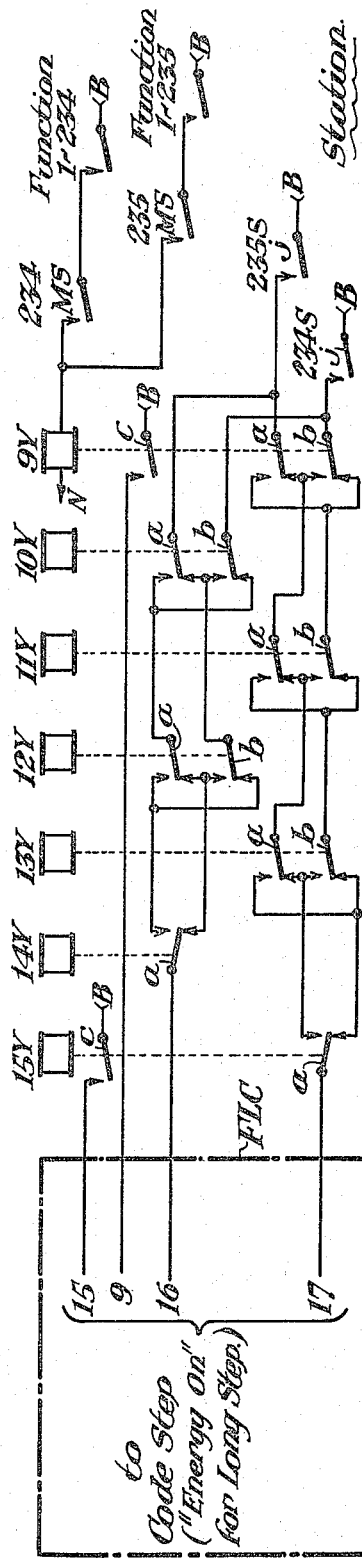
Figure 3B:
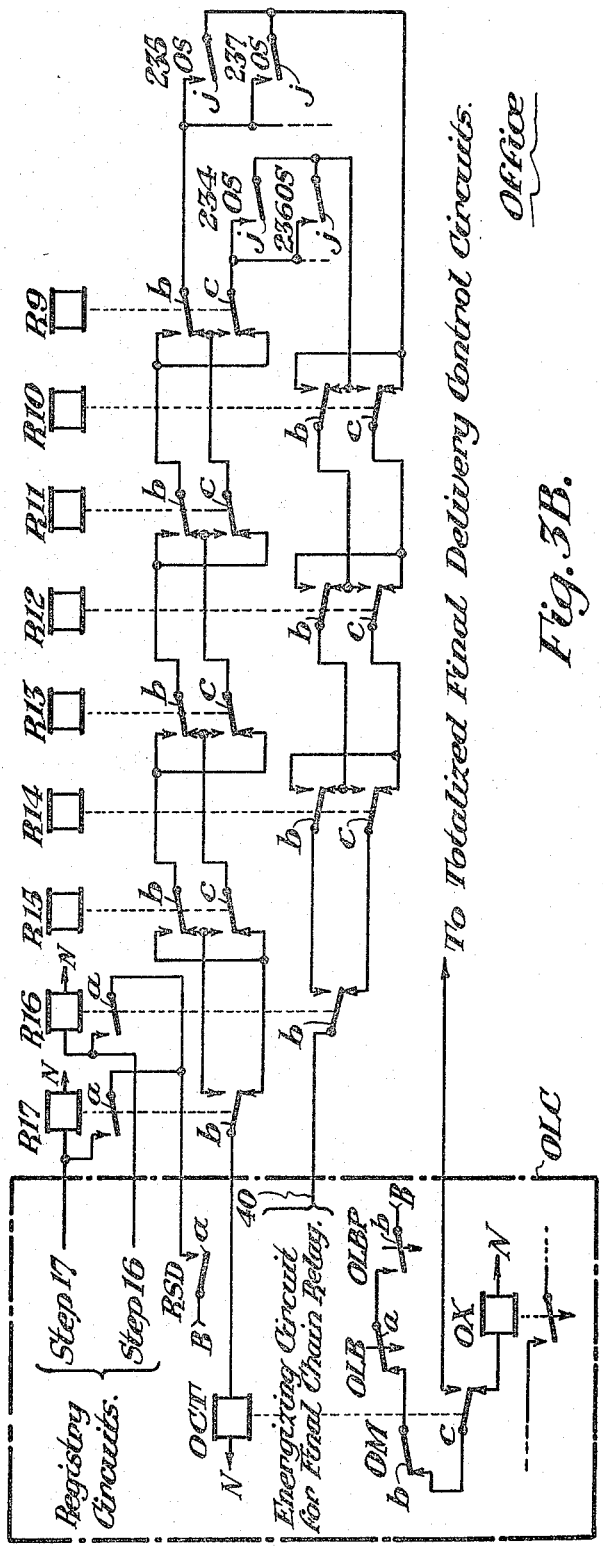

The circuits illustrated in FIGS. 3A and 3B are a modification of the code characteristic determining circuits of the code integrity system of FIGS. 1 and 2, the circuits of FIGS. 3A and 3B embodying a second form of my invention.

In each figure of the drawings, similar reference characters designate similar parts of the apparatus.

For convenience in illustration and description, my invention is shown as being applied to a remote control system of the time code type. However, as the general and detailed descriptions which follow progress, it will become evident to those skilled in the art that the invention is applicable as well to binary, polar, and other types of code systems and such applications are included in the scope of my invention. In the time code system, herein considered, the code characters consist of long and short code steps in selected patterns. These steps also have an alternate energy "on," energy "off" arrangement. However, it is the long and short steps with which the code character is specifically concerned, that is, it is the length of the code step which carries the intelligence from the transmitting location to the receiving location. However, as spurious pulses are induced into the communication channel used by the code system, they may cause any one of several types of fault conditions. For example, these spurious pulses may add to or subtract from the actual number of long code steps, or they may change the actual number of code steps within the code by breaking a transmitted long step into a plurality of short steps. An even more serious condition which may occur is the shift in the selected pattern of transmitted long and short steps which carry the desired functions and station selection. Under these conditions, the code as modified by the induced spurious pulses may select an incorrect station location or may register an improper function control. In the practice of my invention, I provide a check of the number of long character code steps transmitted by a station. An indication of a preselected characteristic of this number is added to the end of the actual code being transmitted so that this indication will be available at the receiving location. This check comprises, basically, separately determining the odd or even characteristic of the actual number of long character code steps transmitted on the even numbered and odd numbered function steps of the code. In the first form, a separate count of the long code steps on the odd and even numbered function-carrying steps of the code is made by a half step relay counter arrangement. In the second form, this character indication is determined by a contact matrix formed of contacts of the indication repeater relays. It is evident that the station selection portion of the transmitted code is also subject to induced error resulting from the spurious pulses. Therefore, a characteristic of the station selection portion of each code is also determined for checking purposes. Each characteristic is based on the sum of the code step numbers which are transmitted with long character in order to select the desired station. This sum, of course, has an odd or even characteristic which is used as the basis for the checking arrangement.

An indication of these established characteristics is transmitted to the receiving station for use at that point. Separate indications actually are used for the odd and even numbered code steps of the transmitted code. Each code characteristic indication, however, is a composite of the characteristic of the corresponding function-carrying steps and the characteristic established for the station selection code being transmitted. This composite characteristic indication is transmitted in the second form of my invention using code steps which are part of the regular remote control code, preferably steps at the end of each code. In the first form the indication is transmitted on code steps which are added to the regular code length only for codes transmitted in the direction in which the integrity check is made. Either form of transmitting the indications is well known in this type of communication art. The form used depends on the capacity of the basic system and/or the need for using the function steps for other purposes. The special indication characteristic is received and registered at the receiving location in the usual manner of the time code system.

Similar characteristics of the function-carrying code steps and the station selection code steps of each code are determined at the receiving location for that code. These function characteristics are obtained in the same manner as at the remote transmitting location, the characteristics being established for each received code. The final integrity check then is completed in the circuit arrangement for the final relay in the counting chain arrangement of the coding unit for the system in use. The energizinz circuit for this final counting relay is modified to include a comparison circuit matrix which compares the received characteristic indications, which are included as part of the received code, with the characteristics established at the receiving location for the code as it is received. If agreement between the received and the locally determined characteristics is not obtained in the comparison matrix, that is, the characteristics are not equivalents, the final code termination relay of the counting chain arrangement is not energized. Failure to energize this final relay prevents the final registry of the functions which have been received as part of the incoming code. Reset of the coding unit under these conditions energizes a reject relay, which is part of the basic system, because the reception of the incoming code has not been completed within the coding unit. Energization of this reject relay causes the system to reset under a fault condition arrangement which initiates a retransmission of that particular code from the originating station. When this comparison of the incoming and locally determined characteristics results in agreement in the matrix circuit, the coding action at the receiving station is allowed to complete, the incoming functions are finally registered, and the system resets to its normal condition, having completed the transmission of the desired code.

Before proceeding with the detailed description of the system of the invention, I shall explain certain of conventional symbols shown in the various sheets of the drawings. Each of the locations of the system illustrated is provided with a source of direct current energy, such as a battery, a rectifier for converting a local alternating current supply, or a direct supply from a generator. These various types of direct current energy sources are well known in the art and the use of such is conventional. Therefore the actual source used is not shown and only its positive and negative terminals are indicated by the reference characters B and N, respectively. Wherever these reference characters appear in the drawings, a connection to the corresponding terminal of the direct current source is intended. Certain of the relays shown in the circuit arrangement are provided with slow release characteristics by which the front contacts remain closed for a period of time after the relay winding is deenergized. Such relays are designated by a downward pointing arrow drawn through the movable portion of each contact of that relay. Other conventional symbols used in the drawing will, as necessary, be described and defined as they first occur in the following description.

Referring now to FIG. 1 of the drawings, there is shown therein a circuit arrangement at a remote station location in a remote control installation which cooperates with the office location shown in FIG. 2, this latter arrangement receiving the indication codes transmitted from the remote station. The system shown in FIGS. 1 and 2, furthermore, is assumed to be similar to that shown in my prior Patent 2,442,603, to which reference was hereinbefore made, and also to the system shown in Manual 514, entitled Time Code Control System, and published in September 1956 by the Union Switch & Signal Division of Westinghouse Air Brake Co., the assignee of this application. Wherever possible in the present case, reference characters similar to those used in my prior patent will be used to designate relays and their contacts for the purpose of simplifying cross reference for a full understanding of the system used. In the present case, my invention is thus applied to check the integrity of the indication codes transmitted from a field station to the control office. It will be apparent, however, that such integrity checks may also be applied to control codes transmitted in the opposite direction. In fact, codes transmitted in each direction in any one system may both be checked for integrity by the system arrangement of my invention.

The remote location illustrated in FIG. 1 is actually assigned two station selection call or code numbers because of the arrangement and operation of the system here shown. These numbers, as further illustrated by the contacts of the station relays S shown at the left of the drawing, are 234 and 235, this arrangement following the order described in the previously mentioned published references. The significance of the two numbers, 234 and 235, is to designate the code steps which are transmitted with a long character during the station selection portion of the indication code. These two station numbers, for purposes of the integrity check, are considered to have, respectively, an odd and an even totalized characteristic. This characteristic is determined from the sum of the numbers forming the station call, for example, the sum of station code call 234 being 9 which is an odd number.

The station line coding unit, similar to the coding unit shown in complete detail in my previous patent, is illustrated in part within the dot-dash rectangle shown in the center of FIG. 1 and designated by the reference character FLC. The system is here assumed to be one in which the normal code length includes 16 steps with two steps being added where necessary to provide the capacity for the integrity check indication. Code steps 2 to 8, inclusive, are assigned for station selection purposes, three of these steps being assigned a long character and the other four having a short character to select the desired station. This further explains the station selection numbers 234 and 235 used in the present illustration. In the center of unit FLC are shown the timing chain relays, such as timing relays 1L, 2L, and LP and bridging repeater relay LBP. Only those relays of the timing chain are shown that are necessary for an understanding of the present invention, the remainder of the chain as shown in my previous patent being used but not shown herein. Bridging relay LBP, it should be understood, is energized and holds up during an entire coding action. Timing relays 1L and 2L release, respectively, during the odd and even code steps having a long character. In each case, their release is followed by the release of timing repeater relay LP to establish the length of the transmitted code step. This action is fully explained in the reference patent and no further explanation is here needed.

Above the timing chain relays is illustrated the final relay of the unit counting chain, the code termination relay CT. This reference character is different from that shown in the previous patent but is more appropriate for the use to which this relay is put in the system operation. During reception of control codes from the system office location, the control circuit for relay CT is relatively unchanged, the portion shown extending from a conventional connection 27 to the counting chain over front contact $a$ of a code reception detection relay RD, which is energized only during code reception, to the winding of relay CT. The portion 27 of this circuit for relay CT, indicated by the conventional dotted line, may be fully studied by reference to the prior patent. It need here only be understood that energy is applied to this conventional connection at the beginning of the 16th step of any code whether it be a received code or a transmitted code. Relay CT is then held energized by a stick circuit direct from connection 30, to which energy is applied during each even numbered code step.

The arrangement of my invention adds, in this first form two relays to the counting chain in order to provide the extra steps for the integrity check. These are the counting relays 16 and 17 shown in the upper left of FIG. 1. These relays are included in the counting chain action only during the transmission of an indication code from this station location. For example, the circuit for energizing relay 16 extends over various circuits within unit FLC, shown conventionally by dotted line 27 and thence over back contact $a$ of relay RD to the winding of relay 16. As previously mentioned, conventional circuit 27 connected to contact $a$ of relay RD is supplied with energy at the beginning of the 16th step of code. Thus relay 16 is energized and picks up on this step of the indication code. Relay 16 is then held energized by a stick circuit inclding its own front contact $a$, back contact $b$ of relay 17, and further circuits within unit FLC shown by conventional dotted line 30.

During the next step of the code, that is, step 17, a pickup circuit is completed for counting relay 17 which extends from conventional connection 28 within unit FLC over front contact $b$ of relay 16 to the winding of relay 17. A stick circuit is then completed for relay 17, which is effective throughout this step of the code, extending from conventional connection 29 within unit FLC over front contact $a$ and the winding of relay 17. A connection over back contact $b$ of relay 16 between conventional circuits 28 and 29 of unit FLC provides stick circuit energy to the preceding counting chain relay, that is, the relay for step 15. The opening of back contact $b$ of relay 17 further interrupts the stick circuit for relay 16 and removes a conventional snub (not shown but part of connection 30) from the relay winding so that relay 16 immediately releases. Connection 29 similarly includes a back contact (not shown) of relay CT to effect a rapid release of relay 17 when relay CT picks up.

At the end of the 17th step of the code, a circuit is prepared for energizing relay CT on the final step of the indication code, in the present case, step 18. This circuit extends from conventional connection 30 within unit FLC over back contact $a$ of relay 16 and front contact $b$ of relay 17 to the winding of relay CT. Energy is supplied to this circuit at the beginning of the 18th step of the code causing energization of relay CT which picks up, completing its own stick circuit to retain this relay energized until the completion of the code step and thus until the completion of the code. The full purpose of these relays added to the unit counting chain and the operation of relay CT will become more apparent during the operational description of the system of my invention included hereinafter in the specification.

Below the timing chain relays within unit FLC is shown, without any control circuits, the chain repeat relay CR. This relay is energized and picks up at the end of the station selection portion of any code to prepare certain circuits which are effective during the latter part of any coding action. Particularly, this relay transfers and/or completes circuits for controlling the transmission of indication functions from this station. This brief explanation of the operation of relay CR is sufficient for purposes of the present description, the full operation and control of this relay being shown in the previously listed references. Master relay M, also shown within unit FLC without control circuits, is conventional in the operation of such apparatus. This relay is energized at the beginning of code transmission from this location and remains energized through the entire indication code to prepare circuits for the operation of the transmitter relays and other pertinent circuits for the control of the transmission of an indication code. Again, the full circuitry for controlling relay M and the description thereof is provided in the previously listed references and the brief explanation given here is sufficient for understanding the present description.

The transmission of indication codes from the station of FIG. 1 over the communication channel is controlled by transmitter relays 1T and 2T shown in the lower part of unit FLC. The actual connections to the line circuit or communication channel, which depend upon the type of communication channel used, are not here shown. However, such circuits and control arrangements are conventional, the variations being well known in the art, and are similar to those shown in the previous listed references. Relay 1T is energized and picks up to start each odd numbered step of the code and releases to initiate the even numbered steps. Relay 2T directly repeats the pick up of relay 1T and, except as modified by its stick circuits, its release. The timing of the odd numbered code steps is controlled by the release of relay 1T, whereas the timing of the even numbered code steps is controlled by the release of relay 2T plus the pick up of relay 1T. The circuit for energizing relay 1T extends from terminal B over conventional circuitry within unit FLC including back contact g of relay CT and back contact b of relay RD, thence over back contact g of relay 17, other conventional circuitry 31 within unit FLC, front contact d of relay M which is closed to establish the transmission of indication codes, back contact b of relay 2T, and the winding of relay 1T to terminal N. As soon as relay 1T picks up, the closing of its front contact c completes the circuit for energizing relay 2T, the circuit also including front contact f of relay M.

Various stick circuits are provided for relay 1T to control the timing and stepping of the indication code. A pulsing circuit to establish the short code steps extends over back contacts of the odd numbered counting chain relays, here represented by the conventional dotted line 31 within unit FLC. The circuit further includes back contact g of relay CT, back contact b of relay RD, back contact g of relay 17 external to unit FLC, front contact d of relay M, front contact b of relay 2T, and front contact a and the winding of relay 1T. When each odd numbered counting chain relay picks up to open its back contact g, if other stick circuits for relay 1T are open at this time, relay 1T is deenergized and releases to establish a code step of short character, the short timing being established by the release time of relay 1T, which has slow release characteristics. Another stick circuit for relay 1T extends from the station selection circuit arrangement, shown conventionally within unit FLC, over front contact a and the winding of relay 1T to terminal N. When this stick circuit is complete and effective to hold relay 1T energized, it establishes, together with a similar stick circuit for relay 2T, the selected long character code steps among the first eight steps of the code to control the station selection code transmitted. After the first eight steps of the indication code have been completed the stick circuit of relay 1T is shifted to the function control stick circuits which are effective during the remaining code steps when it is desired to send a step of long character. One branch of this stick circuit extends from terminal B at front contact a of the odd repeater relay OP over front contacts b and e, in multiple, of relays LP and 1L, respectively, and thence over front contact a and the winding of relay 1T to terminal N. The other branches of this function stick circuit arrangement will be traced later at a more appropriate time in the specification.

Relay 2T is also provided with several different stick circuits, each effective after relay 1T has released to hold relay 2T energized for a selected period of time to estabish the character of the even numbered steps. Each of these stick circuits includes front contact a of relay 2T, back contact C of relay 1T, and front contact f of relay M. The pulsing circuit for establishing the short even numbered code steps further includes back contact g of the even numbered counting relays, here represented by back contact g of relay 16 and the conventional dotted line 32 shown within unit FLC. This stick circuit holds relay 2T energized until the corresponding even numbered counting chain relay picks up. If no other stick circuit is then effective, relay 2T releases at the end of its slow release period to energize relay 1T and thus terminate an even numbered code step of short character. Various station selection circuits of the arrangement are effective at selected times to establish the long even numbered code steps during the station selection portion of the code. Finally, a stick circuit network is provided for establishing long character code steps during the function transmission portion of the code. One branch of this network includes front contact a of even repeater relay EP and front contacts e, in multiple, of relays 2L and LP of the timing chain.

In vertical column at the right of FIG. 1 are shown a plurality of indication contacts. These are divided into two groups of seven each, contacts K1 to K7 and contacts Z1 to Z7. Each group is assigned to a different station code number at this location. This grouping is made since the capacity of each code in the assumed system is seven indication or control functions only. Each contact is assigned to a different one of the code steps 9 to 15 of the codes from the corresponding station. In the present showing, when the indication contact is closed, the assigned code step is transmitted with a long character, and when the contact is open, a short character, to establish the desired function condition at the receiving location. The actual arrangement used to establish the long step character, that is, to control the transmission circuits to send a long code step during the corresponding code step for each code indication contact, is similar to that shown in Letters Patent of the United States No. 3,011,149, issued November 28, 1961, to D. B. Funston for Indication Transmission Circuits for Remote Control Systems.

Briefly described, each indication contact is repeated in transmission sequence by a repeater relay whose contacts are capable of carrying the current required to control the transmitter relays. The odd numbered indication contacts are repeated by odd repeater relay OP, the even numbered by even repeater relay EP. The circuits for controlling the repeater relays are also controlled by contacts of the counting chain relays of unit FLC. In addition, each control circiut includes a front contact of the master and station relay MS corresponding to the station to which the indication is assigned. The MS relay of a station is energized and picks up to close its front contacts during the transmission of an indication code (M relay picked up) from the corresponding station after the station selection code number has been transmitted (S relay picked up). A complete description of such relays and their control is included in the aforementioned references and need not be repeated herein. Thus, for simplicity, only the contacts of these MS relays necessary for the control circuits for relays OP and EP are shown, divided into two sets in vertical column at the extreme right of FIG. 1. Each set is distinguished by a reference character above the top contact designating the controlling MS relay, the reference including a numerical prefix designating the station code number to which assigned.

A typical circuit for relay OP thus may be traced from terminal B over front contact a of relay 234MS, contact K1 of the indication contacts assigned to that station number, front contact 1f of the counting chain relays, specifically of chain relay 1, front contact e of relay CR and the winding of relay OP to terminal N. Front contact e of relay CR is used to assure that this repeating action occurs only during the function transmission portion of the code, that is, code steps 9 to 15, inclusive. Another circuit may be traced from terminal B over front contact d of relay 235MS, contact Z4, front contact 4f of the counting chain relays, front contact f of relay CR, and the winding of relay EP to terminal N. The contacts 1f to 7f inclusive, are controlled by the counting chain relays of unit FLC. The designation of each of these front contacts includes a numeral indicating the counting chain relay which controls the contact and a lower case letter which corresponds to the similar contact designation in my prior patent, so that cross reference may be easily made. These contacts close in sequence during the counting chain action, there being two cycles or sequences of the closing action. However, because of the front contacts of relay CR, the circuits for relays OP and EP are effective only during the latter or function transmission portion of an indication code. The operation and description of this circuit network for controlling the indication repeater relays is further described in the aforementioned Funston patent and reference is made thereto for a complete showing and description of the arrangement. Reviewing briefly, it is necessary here only to understand that relays OP and EP are energized on odd and even numbered code steps, respectively, during the transmission of an indication code when it is desired to transmit a code step having a long character to indicate the closed condition of the corresponding indication contact.

It is thus obvious from the preceding discussion that relays OP and EP between them register each long function step transmitted from the station location. These relays thus can serve as a source for a count of the transmitted long function code steps. Two counting arrangements are provided, each of the half step relay type, comprising the odd repeater operation relay OPO and its repeater relay OPOP and the even repeater operation relay EPO and its repeater relay EPOP. The first pair of relays count the odd numbered code steps of long character transmitted and the second pair count the long even numbered code steps. Energy for the operation of the counting arrangement is supplied from terminal B over front contact a of relay LPB to bus connection 21. Relay LPB was previously described as holding its front contacts closed during an entire coding action, this relay being energized on the first step of any code. Thus during the transmission of the complete indication code, bus connection 21 is equivalent of the positive terminal of the local source of energy and will be so considered in the following description of the long step counting arrangements.

When relay OP is first energized over one of its previously traced circuits to establish the long character of an odd numbered code step during the indication code, that is, during the latter portion of the code when the functions are being transmitted from this station, the closing of front contact b of relay OP completes a circuit from bus 21, further including back contact a of relay OPOP, to energize the winding of relay OPO which, thus energized, picks up. When relay OP releases at the end of this code step, the closing of its back contact c completes a stick circuit to bus connection 21 to retain relay OPO energized. In addition, the closing of back contact d of relay OP completes an energizing circuit from bus connection 21 to the winding of relay OPOP, this circuit further including front contact b of relay OPO. Relay OPOP, thus energized, picks up to close its front contact a opening the corresponding back contact to interrupt the energizing circuit for relay OPO. When relay OP is next energized during an odd numbered code step to establish a long character for transmission, the opening of back contact c of this relay interrupts the stick circuit for relay OPO. Since back contact a of relay OPOP is open at this time, the winding of relay OPO is thus deenergized and this relay releases. The closing of front contact b of relay OP, however, establishes a stick circuit for relay OPOP, including front contact a and the winding of this latter relay, which is thus retained in its picked up position although its energizing circuit is open at both back contact d of relay OP and front contact b of relay OPO. When relay OP releases at the end of this second long step, the opening of its front contact b interrupts the stick circuit for relay OPOP and this latter relay releases.

If relay OP is again energized during the same code to transmit another long character code step, relay OPO is again energized over the previous traced energizing circuit and is retained energized by its stick circuit, also previously traced. Relay OPOP also is energized when relay OP releases and holds during the following long step. It is thus obvious that relay OPO in its picked-up condition establishes the odd characteristic for the count of the long character odd numbered code steps of the indication code. Conversely, relay OPO in its released condition establishes an even characteristic for the count of the long character odd numbered steps of the code. The position of relay OPO may then be used in establishing the totalized characteristic indication, transmitted at the end of each code, regarding the transmitted odd numbered steps of that code.

It is obvious from observation of the circuits shown in the drawing that the half step counting relay arrangement, for the even numbered code steps transmitted during the function transmission portion of the indication code, operates in the same manner as that just described for the odd numbered counter. The half-step relay arrangement comprising relays EPO and EPOP, in other words, is driven by relay EP to record the long character, even numbered steps of the code, the position of relay EPO establishing the even or odd characteristic of this count. It is to be noted that the half step counting relays do not operate during code steps 16 and 17 since, as will become apparent, relays EP and OP do not control the timing of these steps.

The system provided by my invention provides for the transmission during a code of an indication of the odd or even characteristic of the total count of both the odd and even numbered function code steps of long character transmitted during the code. The stick circuits for transmitter relays 1T and 2T, controlled respectively by front contacts a of relays OP and EP, which establish the long character of the function code steps have been previously described. Supplemental stick circuits are provided for controlling the transmitter relays, that is, for holding them energized for an additional period established by the timing relays, to characterize the indication functions to be transmitted during steps 16 and 17 of the code. These stick circuits for the transmitter relays include contacts of relays OPO and EPO to establish the totalized characteristic of the function count and also front contacts of the station relays for the two station calls at this location for modifying the function characteristics to also provide a check of the transmission of the station selection code.

For example, a circuit for relay 1T may be traced from terminal B over front contact a of relay 234S, back contact c of relay OPO, front contact c of relay 17, front contacts b and e, in multiple, of relays LP and 1L, respectively, and front contact a and the winding of relay 1T to terminal N. This stick circuit retains relay 1T energized until the opening of front contact b of relay LP at the end of its slow release period. This holding period for relay 1T also includes the release time of relay 1L, which must release to deenergize relay LP. Thus if relay OPO is in its released condition, indicating a totalized even characteristic of the count of the long character odd numbered function code steps, the composite indication transmitted from station 234 (an odd characteristic station call) will cause the odd numbered code step 17 to be of long character. A similar circuit for relay 2T includes back contact c of relay EPO, front contact c of relay 16, and front contacts e, in multiple, of relays LP and 2L. This circuit causes code step 16 to be transmitted with a long character to indicate that the count of the even numbered code steps has an even characteristic and that the station code sum is an odd number. It can be seen that, if the count originates from station 235, relays 1T and 2T are held energized to create long code steps 17 and 16, respectively, if relays OPO and EPO, respectively, are energized so that their front contacts c are closed. Thus if the indication code originates at a station whose station call sum has an odd number characteristic, such as 234, the corresponding integrity check code step is transmitted with a long character if the function step count has an even characteristic and short if it has an odd characteristic. However, if the count originates at a station having an even number characteristic station code, such as 235, the integrity check code step is long if the corresponding function count has an odd characteristic and is short if the corresponding function count has an even characteristic.

If a check of the transmission of the station selection code is not desired in the system, the contacts of the station relay S may be eliminated from the previously traced circuits. Under these conditions the check code step will have a long code character if the corresponding function step count has an even characteristic while the check step will have a short character to represent an odd characteristic of the function step count. While this arrangement is possible, it is highly desirable that a check of the entire code be accomplished in a manner shown in the drawings by including contacts of the station relay in the check characteristics matrix. Front contacts of the station relay, such as contact a of relay 234S, will close when the station selection call has been transmitted during the initial part of the indication code transmission and will remain closed for the rest of the coding action.

I shall refer now to FIG. 2 of the drawings wherein is shown the circuit at the office location which, for indication codes, is the receiving station for each code. It will be noted, as previously mentioned, that although the integrity check arrangement herein disclosed is applied to the indication code only, the check may also be applied to control codes only or may be applied to both types of codes in a single installation. At the left of FIG. 2 is shown, by conventional dot-dash rectangle, the office line coding unit OLC. Since the basic system to which the arrangement of my invention is applied is herein assumed to be similar to that shown in my prior Patent 2,442,603, the office coding unit OLC is shown in conventional manner and only those details are included within the rectangle that are necessary for a direct understanding of the present arrangement. In order to facilitate cross reference from the present case to the prior patent, the reference characters where possible are the same as those shown in my prior patent. In addition, the reference characters are similar to those used in the station location of FIG. 1, the prefix O, indicating the office location, being added to otherwise identical reference characters in order to distinguish between the two locations.

At the office location, master relay OM, chain repeat relay OCR, and code receiving relay ORD are similar in operation to the similar relays shown at the station location. In addition, a receiving and station detection relay RSD, shown within unit OLC, repeats the operation of relay ORD after the station selection code number has been received during the indication code. Thus, relay RSD picks up during the first portion of the indication code reception and remains with its front contacts closed throughout the remainder of the code. Code termination relay OCT, the final counting chain relay, is similar to relay CT at the station location. The pick-up circuit for this relay effective during indication code reception will be described shortly. During the transmission of control codes from the office, relay OCT is energized from lead 37, to which energy is applied at the beginning of the 16th code step, over front contact a of relay OM, relay OM being energized during an entire control code so that its front contacts are closed. This energization of relay OCT occurs at the beginning of the 16th step, in the system assumed herein, to initiate the termination of the control code action.

The office timing chain relays provide the same functions as do the similar relays at the station location. Relays O1L and O2L serve to time the odd and even numbered code steps, respectively, each relay releasing during each corresponding code step of long character. During code reception, the timing relay similar to repeater relay LP shown at the station is not involved in the arrangement and is not herein shown. However, both bridging relays are indicated, relays OLB and OLBP. Each of these relays is provided with sufficient slow release characteristic to remain with its front contacts closed during the entire coding action. At the end of any code during the release and reset procedure, relay OLB releases prior to relay OLBP. In fact, the release of relay OLB deenergizes relay OLBP which obviously then releases at a later time.

Counting chain relays O16 and O17, external to coding unit OLC, are added to this system by my invention in order to provide additional steps to the indication coding action for the integrity check. During the reception of an indication code, relay O16 is energized at the beginning of the 16th step of that code by energy from the counting chain relay arrangement of unit OLC over connection 37, back contact a of relay OM, which remains closed during indication codes, and through the winding of relay O16 to terminal N. This is similar to the operation of relay 16 at the field on the same code step. Relay O16 is held energized by a stick circuit including its own front contact a and winding, back contact b of relay O17, and connection 40 from the counting chain arrangement of unit OLC. It is to be noted that energy is applied to connections 39 and 40 during each odd and even numbered code step, respectively. At the beginning of the next step of the indication code, energy is applied from unit OLC over line connection 38 and front contact b of relay O16 to the winding of relay O17. This latter relay, being thus energized, picks up. The stick circuit for relay O17 includes connection 39 from unit OLC and front contact a and the winding of relay O17. Again, the connection between leads 38 and 39 over back contact b of relay O16 provides stick circuit energy to the counting chain relay within unit OLC which is energized during the 15th code step. When relay O17 picks up, the opening of its back contact b further interrupts the stick circuit for relay O16 which now releases immediately. The release of relay O16 and the pick up of relay O17 prepares a circuit for the later energization of relay OCT, which will be described shortly.

If step 16 of the indication code has a long character, registry relay R16 is energized during this code step. The circuit for energizing relay R16 can be traced from terminal B over front contact c of relay OLBP, circuits within unit OLC shown conventionally by a dotted line, back contact d of relay O2L, which relay releases during a long, even numbered code step, front contact d of relay OCR to establish that this long step occurs during the function portion of the indication code, front contact e of relay O16, and the winding of relay R16 to terminal N. If code step 17 has a long character so that relay 1L releases during this odd numbered code step, a similar circuit exists for relay R17 which includes front contact a of relay OLBP, circuits within unit OLC shown conventionally by a dotted line, back contact d of relay O1L, front contact b of relay OCR, and front contact e of relay O17. The stick circuit for each of these registry relays includes its own front contact a and front contact a of relay RSD, which remains closed throughout this entire latter portion of the indication coding action. Relays R16 and R17, if energized, are thus held energized by their stick circuits until the end of the indication code.

A receiving and station detection repeater relay RSDP repeats the operation of relay RSD through the 15th step of the indication coding action. The circuit for relay RSDP is traced from terminal B over front contact d of relay OLBP, back contact b of relay OCT, front contact b of relay RSD, back contacts g of relays O16 and O17, and the winding of relay RSDP to terminal N. Obviously, this circuit for relay RSDP is interrupted during the 16th, 17th, and final step of the indication code so that relay RSDP releases during the initial part of step 16 and remains released throughout the remainder of the indication code.

At the office location, the release of timing relays O1L and O2L is used to determine the reception of code steps having a long character, relay O1L for the odd numbered code steps and relay O2L for the even numbered steps. Each release of these relays is counted in separate arrangements to establish the totalized characteristic of that long step count. Counting is accomplished by two half step relay arrangements, each comprising a pair of relays, i.e., odd registry operating relay ORO and its repeater relay OROP and even registry operating relay ERO and its repeater relay EROP.

The first time relay O1L releases to signify the reception of a function code step having a long character, the circuit is completed for energizing relay ORO. This circuit extends from terminal B over front contact *a* of relay OLBP, various conventional circuits within unit OLC, back contact *d* of relay O1L, front contact *a* of relay RSDP, back contact *a* of relay OROP, and the upper winding of relay ORO to terminal N. Relay ORO picks up, closing its front contact *a* to prepare a stick circuit for itself, which further includes front contact *b* of relay RSDP, and is finally completed at front contact *g* of relay O1L when this relay picks up on the following even numbered code step. When the stick circuit for relay ORO is completed, the lower winding of relay OROP is also energized by the same circuit and this relay picks up, opening its back contact *a* to further interrupt the energizing circuit for relay ORO which was initially interrupted at back contact *d* of relay O1L. The next time relay O1L releases to signify the reception of a second long character code step, the closing of its back contact *d* completes a stick circuit for relay OROP further including front contact *a* of relay RSDP. The opening of front contact *g* of relay O1L at this time interrupts the stick circuit for relay ORO which then releases. Relay OROP is deenergized at the termination of this odd numbered code step by the opening of back contact *d* of relay O1L when this relay again picks up. It is thus evident that relay ORO is in its pickup-up condition at the end of each odd count of the long character code steps represented by relay O1L, that is, the odd numbered code steps. Relay ORO is in its released condition at the end of each even count of the operations of relay O1L. When relay RSDP releases at the beginning of the 16th step of the code, another stick circuit is completed if relay ORO is at that time in its energized condition. This second stick circuit includes, in addition to front contact *a* of relay ORO, back contact *b* of relay RSDP and front contact *e* of relay OLBP, this latter contact remaining closed until the end of the coding action and the reset of the coding unit.

It is obvious from an examination of the circuits in FIG. 2 that the operation of the other half step relay arrangement, including relays ERO and EROP, is similar to that just described for the odd step counting relays. Relays ERO and EROP, of course, count the release operations of timing relay O2L. Relay ERO thus is in its picked up or released condition to represent the registry of an odd or even count, respectively, of the even numbered code steps receiving at the office having long character. Relay ERO has a final stick circuit effective during the 16th, 17th, and 18th steps of the code including its own front contact *a*, back contact *d* of relay RSDP, and front contact *e* of relay OLBP.

Since relay RSD, and thus its repeater relay RSDP, cannot pick up until after station selection is accomplished, i.e., the third station selection code step is registered, there will normally be no more long code steps during the remainder of the station selection portion of an indication code after relay RSDP picks up. Thus, after front contacts *a* and *c* of relay RSDP close to prepare the circircuits for relays ORO and ERO, the only long code steps properly received are function carying code steps. If a fourth station selection code step is improperly received, rejection circuits which are part of the basic system halt the code receiving action and prevent registry of that code. Since relay RSDP releases at the beginning of the 16th code step, the drive circuits for the half step counters are interrupted and the character of steps 16 and 17 cannot change the function step count characteristics registered in relays ORO and ERO. The operation of relay RSDP thus assures that the half step relay arrangements count only long code steps during the function transmission portion of the code.

At the beginning of the last or 18th step of the indication code received from the station, the circuit is completed for relay OCT if the combined characteristics of the received station selection code and the local count of the long character function code steps received agree with the indications of the similar composite characteristics received from the station as part of the indication code. In other words, relay OCT is energized by a comparison circuit arrangement that checks the correspondence or equivalent nature of the odd step count completed at the office with the composite indication from the station of the odd step count at that location and the even step count at the office with the composite indicaion received from the station of the even step count at that location. This comparison circuit also includes a station selection code check in order to agree with the similar check made at the field location.

I shall trace a circuit for relay OCT which exists when a code is received from station 234 at the field location, with indications of an even characteristic for both the even and odd numbered long character function steps of that code. Under these conditions, the circuit for relay OCT, in the portion shown, originates at lead 40 from unit OLC, to which energy is applied during each even numbered code step, and continues over back contact *a* of relay O16, front contact *b* of relay O17, these two contacts assuring that it is the proper code step, front contact *b* of relay R16, back contact *b* of relay ERO, front contact *j* of station selection relay 234OS, back contact *b* of relay ORO, front contact *b* of relay R17, and the winding of relay OCT to terminal N. In this circuit, back contacts of relays ERO and ORO indicate that the total even and odd numbered code steps having long character were of an even characteristic as counted at the office. Front contact *a* of relay 234OS determines that, with this even characteristic of the two counts, relays R16 and R17 should be energized if a comparison is to be made and agreement reached with the code as transmitted from the remote location. Since all these conditions obtain under the assumed conditions, the circuit is complete for energizing relay OCT. If the count of the long character even numbered code steps at the office had resulted in an odd characteristic, so that relay ERO is energized, relay R16 should be in its released condition in order to obtain an agreement with the station count. The circuit would then include back contact *b* of relay R16 and front contact *c* of relay ERO, the remainder of the circuit being as previously traced.

Another example will be traced in detail with the assumption that the code originate in station 235 at the field location but that the other original conditions are the same. Under this situation, with relays ERO and ORO released to indicate even characteristics, relays R17 and R16 must also be released in order to complete the circuit which includes back contact *b* of relay R16, back contact *c* of relay ERO, front contact *j* of relay 235OS, back contact *c* of relay ORO, and back contact *b* of relay R17. It is to be remembered, however, from the description of the station circuits of FIG. 1, that, under identical count conditions, the step character transmitted during step 16 or 17 by station code 235 (an even station characteristic) is opposite to that transmitted by station code 234 (an odd station characteristic). Thus, although relays R16 and R17 were energized with the originally assumed conditions, the corresponding code steps are now of short character and relays R16 and R17 remain released. Thus agreement exists and this circuit just traced is complete to energize relay OCT to finish the code. Other circuits for relay OCT under various assumed conditions may be traced as desired by reference to the circuits.

When relay OCT picks up during the last step of the code, the circuit is complete for actuating the final totalized delivery of the received functions. The circuit is completed during the final step as the system begins to reset and includes front contact b of relay OLBP, back contact a of relay OLB, back contact b of relay OM, front contact a of relay ORD, front contact c of relay OCT, and thence to the control circuits for the totalized final delivery arrangement, normally energizing the winding of the station delivery relay corresponding to the selected station relay OS. Under these conditions, the functions temporarily stored in relays for the other code steps similar to relays R16 and R17 are transferred to the final function stick relays by which the indications are retained for display and recording. If the code characteristics determined and established locally at the office do not compare as equivalent to those received from the field location so that relay OCT is not energized during the final step, the circuit is then completed for rejection relay OX, the circuit being the same as that just traced including front contact b of relay OLBP and back contact a of relay OLB and finally, back contact c of relay OCT to the winding of relay OX. The pick up of relay OX causes the code to be rejected, prevents the totalized final delivery of the received functions, and resets the entire system to its normal condition, at the same time causing the field location to initiate another coding action to repeat the code just transmitted in order to obtain a correct reception at the office. Relay OX, shown within unit OLC, is the same as that shown in my prior patent, and in addition to the circuit just traced, has other energizing circuits for rejecting a code under other improper situations.

I shall now briefly describe the operation of the system including this first form of my invention, referring to FIGS. 1 and 2 of the drawings during this description. It is assumed that the station having the code 234 transmits an indication to the office while indication contacts K1, K2, K4, K5, and K6 are closed. Upon the initiation of this coding action, relay M picks up so that the circuits are prepared for relays 1T and 2T to be driven by the coding action and, in turn, to drive the transmission of the code over the communication channel to the office. During the function transmission portion of the code, it is obvious, from the assumed conditions, that relay OP is energized when contacts 1f and 5f of the counting chain relays are closed since the circuits are further completed over closed contacts K1 and K5. Relay EP is energized when counting chain contacts 2f, 4f and 6f are closed. Since these actions occur during the latter or function transmission portion of the indication code, code steps 9, 10, 12, 13, and 14 are transmitted having a long character, the proper transmitter relay being held energized by stick circuits including front contact a of relay OP or relay EP as the situation may demand.

Since code steps 9 and 13 are long, the count of the odd numbered code steps having a long character has an even characteristic as determined by the operation of relay OP. Since code steps 10, 12, and 14 are long, the count of the long even numbered code steps has an odd characteristic. The various half step counting relay arrangements are driven during the coding action in a manner previously described. Relay OPO picks up and releases during the code since two odd numbered steps are long, while relay EPO ends in its energized, that is, picked-up condition, held by the stick circuit including back contact c of relay EP and front contact a of relay LBP until the end of the coding action. Thus, when relay 16 picks up during the counting chain action, with front contact a of relay 234S closed, there is no circuit available to hold transmitter relay 2T energized for more than a pulsing code step, that is, a short code step. Thus this relay is deenergized when back contact g of relay 16 opens and releases shortly thereafter for a short code step. When relay 17 picks up on the following step, the circuit including front contact a of relay 234S and back contact c of relay OPO is complete for holding relay 1T energized after back contact g of relay 17 opens. The release of relay 1T is then controlled by the timing of relay LP of the timing chain relays to establish a long code step 17. It may be noted in passing that if the code is being transmitted by the station 235, the character of steps 16 and 17 is reversed since front contact a of relay 235S is connected to front contacts c of relays EPO and OPO. This illustrates the opposite character of the code steps which are transmitted depending upon whether the station selection code has an odd or even characteristic. This indication code is terminated in the usual manner by the energization of relay CT upon the final or 18th step of the indication code, the apparatus at the station location resetting to its normal condition at this time.

At the office, the initiation of the code at the station also actuates unit OLC to follow the coding action. The coding at both locations is maintained in synchronism in the usual manner of such systems. During the initial portion of the reception of the indication code, relay 234OS at the office is selected to indicate the station from which the code is being received. The various indication functions are received and registered, particularly in connection with those functions which are transmitted by the long character code steps. During the coding action, the various releases of timing relays O1L and O2L drive the counting relays of the half step arrangements during steps 9 to 15 as determined by relay RSDP. Obviously, under the assumed conditions and if the code is correctly transmitted, relay ORO records two counts during code steps 9 and 13 so that it is in its released condition at the end of the action. Relay ERO records three counts during steps 10, 12, and 14, so that it is in its picked-up position at the termination of code step 15. When relay O16 picks up on the 16th step, relay RSDP is de-energized and releases, its circuit being interrupted at back contact g of relay O16. This release of relay RSDP interrupts the operating circuits for the half step relay counters and transfers the stick circuit for the energized relays ORO or ERO, as the situation may be, to front contact e of relay OLBP. Since relay O2L holds during the 16th step, which is of short character as previously described during the transmission of the indication code from the station, relay R16 is not energized and thus records an odd characteristic for the count of the long even numbered steps at the station. This is followed by the energization and pick up of relay O17, which at its back contact g, continues to hold relay RSDP deenergized. Relay O1L releases during this code step, which is of a long character, and, therefore, relay R17 is energized and picks up, being thereafter held by the stick circuit including front contact a of relay RSD. The pick up of relay R17 registers an even characteristic for the long odd numbered code steps as transmitted from the station.

During the 18th step of the indication code, energy is placed by unit OLC on lead 40 in the usual manner. Since it has been assumed that the code as received at the office is identical with the code as transmitted from the station, that is, no faults or induced pulses have occurred, the circuit is now complete for energizing relay OCT. This time it may be traced from lead 40 over back contact a of relay O16, front contact b of relay O17, back contact b of relay R16, front contact c of relay ERO, front contact j of relay 234OS, back contact b of relay ORO, front contact b of relay R17, and the winding of relay OCT to terminal N. Since the comparison circuit does indicate agreement between the locally established characteristics and those received from the station, the energization of relay OCT completes the coding action at the office location and, by closing its front contact c, actuates the totalized final delivery control circuits to finally register the received indication functions.

For purposes of example, let us assume that the station selection portion of this indication code is shifted by pulses induced into the communication channel from some external source so that the character of code steps 4 and 5 are reversed, that is, 4 becomes short and 5 becomes of long character as received at the office location. This changes the station selection code from 234 to 235. However, this appears to be a proper code combination as received by the office apparatus. Relay 235OS is then selected and energized rather than 234OS as an initial example. The remainder of the code continues as in the situation initially described, the steps being received with the characters assumed so that the conditions previously described exist for relays R16, R17, ERO, and ORO. However, during the last code step, the circuit for OCT is not now complete since front contact j of relay 234OS is open, this relay not having been selected by the improper code. At the same time, front contact j of relay 235OS is closed, but no circuit exists over this contact by which energy may be applied to relay OCT. This may be illustrated by tracing the circuit over back contact b of relay R16 and front contact c of relay ERO to determine that there is no connection to front contact j of relay 235OS.

As another example, let us assume that such induced pulses cause code step 13 to change from a long character to a short character, that is, from a long step to a short step. Thus, during the reception of code step 13 at the office, relay O1L does not release and relay ORO thus records but a single count resulting from the long character of code step 9. Relay R17 is still energized during the 17th step since code step 13 was transmitted long from the station, and the circuit was completed for holding relay 1T at that location energized during the 17th code step to establish the long character. During the final step of the code as received at the office, the circuit for relay OCT is then incomplete, being traced, in part, over back contact b of relay R16, front contact c of relay ERO, front contact j of relay 234OS, front contact b of relay ORO which remains in its picked-up condition at the end of the count, and thence the circuit is interrupted at back contact b of relay R17, this contact being closed in its front position. Under either fault condition, relay OCT remains in its released position when relay OLB releases during the reset action of the apparatus. The circuit is then complete for energizing relay OX to reject the code and halt the registry of the received indication functions, and to cause a reset action of this system which restarts the coding action at the field station. Other possible fault conditions would cause similar results. Such conditions may be assumed and traced through the comparison circuit as desired by reference to the drawing of FIG. 2.

I shall refer now to FIGS. 3A and 3B wherein is shown a modification of the circuitry previously described, embodying a second form of the arrangement of my invention. This second form of my invention is for application to a code system which has extra code steps available for carrying the characteristic indications of the count of the long code steps without the necessity for adding relays to the counting chain to provide additional steps for this purpose. In the second form, the indication functions themselves are controlled directly by individual repeaters of the indication contacts or by the indication relays themselves, although, as shown, individual repeaters of the indication contacts or functions are used. In the station arrangement of FIG. 3A, only those circuits which are modified as compared with the arrangement of FIG. 1 are shown in detail.

The relays Y, shown across the top of FIG. 3A, are used to repeat or temporarily register the indications assigned at the field location prior to their transmission during an indication code. A typical circuit for these relays is illustrated in the upper right of FIG. 3A for relay 9Y, the network being that used at a remote location at which two station calls are assigned, as before the codes 234 and 235. A first circuit for relay 9Y includes a contact responsive to the number one function assigned to station code 234 and closed when that indication function requires a transmission of a long character on the corresponding step of the code. This circuit further includes a contact of relay 234MS which relay repeats both the master relay of unit FLC and the station relay for the assigned code so that this contact is closed only during an indication code after the station selection code 234 has been transmitted. Relay 9Y is then energized and picks up to control over its front contact c a circuit which actuates the transmission of a long character step 9 during the indication code, this circuit providing energy over a counting relay contact to hold the transmitter relay energized for the long step in the manner previously discussed in connection with FIG. 1. A second circuit for relay 9Y includes a contact responsive to the number one function assigned to station 235 and again closed when that function requires the transmission of a long character code step. This second circuit further includes a front contact of relay 235MS, which is similar in operation to relay 234MS previously described. Relay 9Y is thus energized when a long character is to be transmitted on code step 9 during the transmission of a code for station 235.

To establish the long or short character of code steps 16 and 17, a matrix of contacts of the relays Y is used to supply energy to the proper lead into unit FLC to hold the transmitter relays energized for long steps as required by the arrangement of function indication steps already transmitted. If it is assumed that, during an indication code, relays 10Y and 12Y are energized and pick up to transmit long character steps, it is obvious that an even number of long steps will be transmitted on the even numbered steps of this code. For station 234, a circuit will then exist to actuate the transmission of a long code step 16, this circuit including front contact j of relay 234S, front contact b of relay 10Y, front contact b of relay 12Y, back contact a of relay 14Y, and the lead for step 16. If, however, the code is being transmitted for station 235, the similar circuit which includes front contact j of relay 235S and front contacts a of relays 10Y and 12Y is open at front contact a of relay 14Y so that code step 16 will be transmitted with a short character. If, in this station 235 code, an odd number of long steps is being transmitted so that relay 14Y, for example, is also energized, the circuit will be complete and code step 16 will be transmitted long.

Assuming that relays 9Y and 13Y are picked up during the code transmission, an even characteristic exists in the number of long odd steps being transmitted. Under these conditions, for station 234, energy is supplied to the lead for code step 17, in order to actuate the transmission of a long character, over the circuit including front contact j of relay 234S, front contact b of relay 9Y, back contact a of relay 11Y, front contact a of relay 13Y, and back contact a of relay 15Y. Under these conditions, for station 235, the circuit including front contact j of relay 235S, front contact a of relay 9Y, back contact b of relay 11Y, and front contact b of relay 13Y is open at front contact a of relay 15Y so that code step 17 will have a short character. Again, if the long odd code step count has an odd characteristic, for example with 11Y also energized, the circuit for station 235 is then complete to the lead for code step 17 and includes front contacts a of relays 9Y and 13Y, front contact b of relay 11Y, and back contact a of relay 15Y.

If all of the various combinations were assumed and traced, it would become evident that, as in the previous arrangement, for stations having an odd characteristic station selection code, long code steps are transmitted on steps 16 and 17 when the previously transmitted corresponding long function code steps have totalized even characteristics while code steps 16 and 17 are of short character when the corresponding function steps have totalized odd characteristics. For the station selection codes having an even characteristic, such as 235, the character transmitted for code steps 16 and 17 is reversed, being short and long, respectively, for even and odd characteristics of the corresponding long step counts.

At the office location shown in FIG. 3B, indication registry relays R are energized in a manner similar to that described in the previous arrangement. For example, if code step 16 as received from a station has a long character, energy is supplied over a corresponding lead from unit OLC to the winding of relay R16. This relay then holds energized over its stick circuit including its own front contact a and front contact a of relay RSD. A similar circuit arrangement is shown for relay R17 which is assigned to code step 17. Similar circuits are provided for relays R9 to R15, inclusive, but are not shown for simplicity. In the present example, under the assumed conditions at the field location during the code from station 234, both relays R16 and R17 are energized during the reception of the indication code and are held energized by their stick circuits.

Assuming that the code is properly received and the station selection is correct, a circuit then exists for energizing relay OCT on the final step of this indication code as received at the office. This circuit for relay OCT includes a matrix of the contacts of the register relays R and the station relays at the office. Under the presently assumed conditions, the circuit extends from lead 40 of unit OLC, to which energy is supplied at the beginning of the final code step, over front contact b of relay R16, back contact b of relay R14, front contact b of relay R12, front contact c of relay R10, front contact j of relay 234OS, front contact c of relay R9, back contact c of relay R11, front contact b of relay R13, back contact b of relay R15, and front contact b of relay R17 to the winding of relay OCT. Relay OCT is thus energized during the final step of this code since the comparison circuit network indicates agreement between the locally received code arrangement and that transmitted from the station as indicated by the condition of relays R16 and R17. Various other circuits, of course, can be traced for relay OCT depending upon the assumed condition of the indication code received. In the circuit just traced, if any of the function steps were received with an incorrect character or the character was shifted from one step to an adjacent step, the circuit for relay OCT will be interrupted and the relay OCT remains deenergized. Further, for example, if the station code 234 was shifted during transmission to be received as code 235, the originally traced circuit is open and no other circuit exists over front contact j of relay 235OS.

When relay OCT is energized at the proper time in the last code step, the circuit including front contact b of relay OLBP, back contact a of relay OLB, back contact b of relay OM, and front contact c of relay OCT is complete to actuate the totalized final delivery control circuits to cause the registry of the indications temporarily stored in relays R9 to R15. If, due to some fault or error condition, relay OCT is not energized during this final step, the circuit is complete for energizing rejection relay OX, the circuit being the same as that traced for the final delivery control circuit except including back contact c of relay OCT and the winding of relay OX. As previously discussed, the energization of relay OX causes the rejection of the code, prevents the final totalized delivery of the received functions, and initiates a reset and restart action at the station location. It is believed that sufficient description has thus been given of the second form of my invention to allow a complete understanding of the operation of the system in this form.

The circuit arrangements provided by my invention thus provide a check of the integrity of code transmission in the remote control system. This integrity check is integral with the transmitted code and eliminates the requirement for any answer-back or additional check code transmission over another channel in order to provide an indication of correct transmission. In the arrangement of my invention, the station code selection, as well as the transmission of the functions, is checked by the comparison circuit at the receiving location. This station check is provided by the shift in the function characteristic check depending upon the odd or even characteristic of the station selection number. The entire arrangement here provided requires a minimum of additional apparatus to provide a complete integrity check of the code and, even in the first form, requires very little extra coding time to accomplish the check action. The check is also independent of any pulse or transmission delay times inherent in the communication channel in use. Thus, by a minimum of additional equipment and arrangement, a check of the accuracy of the code transmission is provided to allow for improved operation of remote control systems.

Although I have herein shown and described but two forms of integrity check circuit arrangements for remote control systems embodying my invention, it is to be understood that various changes and modifications may be made therein within the scope of the appended claims without departing from the spirit and scope of my invention.

Having thus described my invention what I claim is:

1. In a coded remote control system including at least two stations connected by a communication channel, said system being operable to transmit stepped codes over said channel at least in one direction between said stations, each code step having a first or a second character of long and short time duration respectively, the combination comprising:

(a) a first detection means at the code transmitting station controlled by said system for determining the number of first character code steps in a first group of steps transmitted during a preselected portion of a code, (b) a second detection means at said transmitting station controlled by said system for determining the number of first character code steps in a second group of steps transmitted alternately with the steps of said first group during said preselected portion of a code, (c) each detection means having connections to said system for controlling the transmission of a particular function on a preassigned separate code step during the terminal portion of a code to indicate the odd-even characteristic of the detected number of first character steps previously determined, (d) a registry means at the receiving station controlled by said system for individually registering both particular functions received from said transmitting station during a code, (e) a third and a fourth detection means at said receiving station controlled by said system for determining the number of first character code steps in said first and said second code step groups respectively of a received code, (f) circuit means at said receiving station controlled jointly by said registry means and by said third and fourth detection means for comparing the received character of both particular functions and the numbers determined by said third and fourth detection means,
 (1) said circuit means having connections for interrupting the registry of the received code when said circuit means indicates a lack of equivalent corresponding characteristics.

2. In combination with a coded remote control system including at least two stations connected by a communication channel, said system being operable to transmit stepped codes over said channel at least in one direction between said stations, each transmitted code step having a long or a short time character:

(a) detection means at the code transmitting station controlled by said system for establishing separate totalized characteristics of the long odd and even numbered code steps transmitted during a preselected portion of a code,
  (1) said detection means having connections for actuating said system to transmit separate indications of the established totalized characteristics during a subsequent portion of that code,
(b) registry means at the receiving station controlled by said system for registering the indications received during said subsequent portion of each code,
(c) another detection means at said receiving station controlled by said system for establishing separate totalized characteristics of the long odd and even numbered code steps received during said preselected portion of each code,
(d) circuit means at said receiving station controlled jointly by said registry means and by said other detection means for comparing the indications registered and the totalized characteristics established during a particular code,
  (1) said circuit means having connections for effecting the completion of the reception of that code only when the corresponding registered indications and totalized characteristics are equivalent.

3. In a coded remote control system including at least two remote stations connected by a communication channel, said system operating to transmit functions in the form of stepped codes over said channel at least in one direction between said stations, each code step having a first character of long duration or a second character of short duration to establish the function carried, the combination comprising:
  (a) a first and a second counting means at the transmitting station each operable between two conditions when successively actuated,
  (b) a drive circuit controlled by said system for actuating said first counting means to record each first character code step in a first group of code steps transmitted during a preselected portion of a code,
  (c) another drive circuit controlled by said system for actuating said second counting means to record each first character code step in a second group of code steps transmitted alternately with said first group code steps during said preselected portion of a code,
  (d) circuit means at said transmitting station controlled by the associated counting means and having connections to said system for effecting the transmission during the code subsequent to said preselected portion of separate indications characterizing the existing condition of each counting means,
  (e) registry means at the receiving station responsive to system operation for recording the count characterizing indications received during a code,
  (f) a third and a fourth counting means at said receiving station each operable between two conditions when successively actuated,
  (g) drive circuit means controlled by said system for actuating said third and fourth counting means to record each first character code step in said first and said second code step groups respectively received during said preselected portion of a code,
  (h) comparison circuit means at said receiving station controlled jointly by said third and fourth counting means and by said registry means for comparing the first character counts recorded and the corresponding count characterizing indications received during a particular code,
  (i) said comparison circuit means having connections for effecting the completion of the reception of that code and the final registry of the functions at said receiving station only when each corresponding count and indication compare as equivalents.

4. In a coded remote control system for handling indication functions between a control office and a plurality of remote stations connected by a communication channel, said system being operable to transmit stepped codes over said channel at least in the direction from said stations to said office, each code step having a first character of long duration or a second character of short duration, each station being designated by a predetermined code combination transmitted during an initial portion of each stepped code, each station code combination having a distinct totalized characteristic, the combination comprising:
  (a) detection means at each station controlled by said system for establishing a first totalized characteristic of the first character even numbered code steps and a second totalized characteristic of the first character odd numbered code steps transmitted during a preselected subsequent portion of each code originating at that station,
  (b) circuit means at each station controlled jointly by the corresponding detection means and by said system for effecting the transmission during the terminal portion of each code from that station of separate indications of the established totalized characteristic of the odd and even numbered code steps each modified by the totalized characteristic of the station code combination,
  (c) registry means at said office responsive to system operation for recording the characterizing indications received during the terminal portion of each received code,
  (d) other detection means at said office controlled by said system for establishing totalized characteristics of the even and odd numbered first character code steps received during said subsequent portion of each incoming code,
  (e) comparison circuit means at said office controlled jointly by said registry means, said other detection means, and said system for comparing the characterizing indications recorded and the established received totalized characteristics as modified by the corresponding received station code totalized characteristic,
  (f) said comparison circuit means having connections for effecting the completion of the reception of that code and the registry of the transmitted functions only when each corresponding indication and modified totalized characteristic compare as equivalents.

5. In a coded remote control system including a plurality of locations connected by a communication channel, said system being operable to transmit functions over said channel in the form of stepped codes at least from one of said locations to another of said locations, each code step having a first or second character of long or short duration respectively, each code from said one location including a first portion which defines a station call combination of first and second character code steps unique to said one location and a second portion which defines transmitted functions by selected first and second character code steps, the first character steps of said station call having a distinct totalized characteristic, the combination comprising:
  (a) a first means at said one location controlled by said system during the transmission of a particular code for determining separately the odd-even characteristic of the total first character odd and even numbered steps transmitted during said second portion of that code,
  (b) a second means at said one location responsive to the odd-even characteristics determined by said first means and to the totalized characteristic of the station call combination and having connections to said system for effecting the transmission during the terminal portion of said particular code of separate functions indicating the composite characteristic of said odd and even numbered steps each combined with said station call totalized characteristic, (c) registry means at said other location controlled by said system during the reception of said particular code for receiving the indicating functions and separately registering the composite characteristics transmitted thereby, (d) a detection means at said other location controlled by said system for determining separately the odd-even characteristic of the total number of first character odd and even numbered steps received during said second portion of said particular code, (e) a station selection means at said other location controlled by said system for registering the station call combination received during said first portion of said particular code, (f) a comparison circuit means at said other location controlled by said registry means, said detection means, and said station selection means for effecting the completion of the reception of said particular code and the final registry of the functions transmitted thereby only when the determined composite characteristics of the received code are the equivalents of the registered composite characteristics of the code transmitted from said one location.

6. In a coded remote control system including a plurality of locations connected by a communication channel, said system being operable to transmit functions over said channel in the form of stepped codes at least from one of said locations to another of said locations, each code step having a long duration first or short duration second character, each code from said one location including a first portion of successive steps which defines a station call combination of first and second character code steps unique to said one location and a second portion which defines transmitted functions by successive selected first and second character code steps, the first characters steps of said station call having a distinct totalized characteristic, the combination comprising:

(a) a first and a second counting means at said one location each operable between two conditions when successively actuated, (b) a drive circuit controlled by said system for successively actuating said first counting means to record each first character code step in a first group of code steps transmitted during said second portion of a particular code, (c) another drive circuit controlled by said system for successively actuating said second counting means to record each first character code step in a second group of code steps transmitted alternately with said first group code steps during said second portion of said particular code, (d) circuit means at said one location with connections to said system and controlled by both associated counting means and responsive to the totalized characteristic of the station call for effecting the transmission during said particular code subsequent to said second portion thereof of separate indications characterizing the combined characteristics of the station call totalized characteristic and the existing condition of each counting means, (e) registry means at said other location responsive to system operation for recording the characterizing indications received during a code, (f) a third and a fourth counting means at said other location each operable between two conditions when successively actuated, (g) drive circuit means controlled by said system and having connections for successively actuating said third and fourth counting means to record each first character code step in said first and said second code step groups respectively received during said second portion of said particular code, (h) a station selection means at said other location controlled by said system for registering the station call combination received during said first portion of said particular code, (i) comparison circuit means at said other location controlled jointly by said third and fourth counting means, by said station selection means, and by said registry means for comparing the combined characteristic provided by the existing condition of said third and fourth counting means and the totalized characteristic of the registered station call combination with the registered characterizing indications, (j) said comparison circuit means having connections for effecting the completion of the reception of said particular code and the final registry of the functions carried thereby only when the comparison determines each corresponding pair of compared characteristics to be equivalents.

References Cited by the Examiner

UNITED STATES PATENTS 3,064,080  11/1962  Rea et al. _____ 340—146.1 XR
3,146,456  8/1964  Silliman _____ 340—146.1

MALCOLM A. MORRISON, *Primary Examiner.*

ROBERT C. BAILEY, *Examiner.*

M. P. ALLEN, *Assistant Examiner.*